United States Patent
Song

(10) Patent No.: US 7,307,970 B2
(45) Date of Patent: Dec. 11, 2007

(54) APPARATUS AND METHOD FOR SEARCHING TRANSMISSION SIGNAL FROM NEIGHBORING BASE STATION

(75) Inventor: Jae-Wook Song, Seoul (KR)

(73) Assignee: LG Electronics Inc., Seoul (KR)

( * ) Notice: Subject to any disclaimer, the term of this patent is extended or adjusted under 35 U.S.C. 154(b) by 1070 days.

(21) Appl. No.: 10/327,051

(22) Filed: Dec. 24, 2002

(65) Prior Publication Data

US 2003/0119510 A1 Jun. 26, 2003

(30) Foreign Application Priority Data

Dec. 26, 2001 (KR) .............................. 2001-85429

(51) Int. Cl.
*H04Q 7/00* (2006.01)
(52) U.S. Cl. ...................... 370/331; 455/436
(58) Field of Classification Search ...................... None
See application file for complete search history.

(56) References Cited

U.S. PATENT DOCUMENTS

| | | | |
|---|---|---|---|
| 5,644,591 A * | 7/1997 | Sutton | 370/342 |
| 5,805,648 A * | 9/1998 | Sutton | 375/367 |
| 6,038,250 A * | 3/2000 | Shou et al. | 370/335 |
| 6,477,162 B1 * | 11/2002 | Bayley et al. | 370/342 |
| 6,697,622 B1 * | 2/2004 | Ishikawa et al. | 370/329 |
| 6,741,578 B1 * | 5/2004 | Moon et al. | 370/335 |
| 6,744,747 B2 * | 6/2004 | Shiu et al. | 370/331 |
| 6,775,252 B1 * | 8/2004 | Bayley | 370/328 |
| 6,944,143 B1 * | 9/2005 | Bayley et al. | 370/332 |
| 7,206,298 B2 * | 4/2007 | New | 370/331 |
| 7,224,719 B1 * | 5/2007 | Hughes et al. | 370/328 |
| 2003/0039228 A1 * | 2/2003 | Shiu et al. | 370/331 |
| 2004/0071119 A1 * | 4/2004 | Ishikawa et al. | 370/335 |
| 2005/0009528 A1 * | 1/2005 | Iwamura et al. | 455/446 |

\* cited by examiner

*Primary Examiner*—Chi Pham
*Assistant Examiner*—Anh-Vu Ly
(74) *Attorney, Agent, or Firm*—Ked & Associates, LLP

(57) ABSTRACT

An apparatus and a method for searching a transmission signal from a neighboring base station acquires a location of present cell through initial cell searching, sets an operation mode according to whether or not rough location information of neighboring cell is provided by the present cell, sets a mask window based on time information of the cell which is already known, searches the section of mask window and remaining sections selectively according to the operation mode, and acquires precise time information of neighboring cells using energy peak searched from the selected section. In this manner the neighboring cells can be searched rapidly and easily by adding the window masking function to the initial cell searching apparatus.

27 Claims, 6 Drawing Sheets

APPARATUS AND METHOD FOR SEARCHING TRANSMISSION SIGNAL FROM NEIGHBORING BASE STATION

BACKGROUND OF THE INVENTION

1. Field of the Invention

The present invention relates to a mobile communication system, and particularly, to an apparatus and a method for searching signals transmitted from neighboring base stations.

2. Background of the Related Art

Generally, international mobile telecommunication-2000 (IMT-2000) can be divided into a synchronous code division multiple access (CDMA) method and an asynchronous CDMA method. These are being standardized by the third generation partnership project 2 (3GPP2) centering around U.S.A. and by third generation partnership project (3GPP), centering around Korea, Europe and Japan, respectively.

The synchronous CDMA method synchronizes cells with the help of a device which tracks absolute time, such as a global positioning system (GPS). The asynchronous CDMA method does not need to synchronize cells.

In the radio environment, when a terminal searches a cell, there are two kinds of searching. The first is an initial cell search, and the second is a neighboring cell search. In an initial cell search, the terminal searches for a base station (cell) from which service will be provided when the terminal is turned on. In a neighboring cell search, the terminal searches cells around the present cell after obtaining information from the present cell through the initial cell search. Information about neighboring cells is always needed for mobile service, including during hand-over.

In neighboring cell searching, the terminal may or may not receive information about the neighboring cells, such as location information, scrambling code, etc. from the present cell. If the terminal is able to acquire this information about the neighboring cells, it is easy for the terminal to search the neighboring cells. However, it is difficult for the terminal to search the neighboring cells if this information is not acquired.

Therefore, an apparatus is needed which will search the neighboring cells easily, regardless of what information is acquired by the terminal. Also, an apparatus is required which is able to search the neighboring cells using a simple hardware device without applying an excessive software load on the terminal.

SUMMARY OF THE INVENTION

An object of the invention is to provide a system and method for searching neighboring cells in a communications service area without using location information, scrambling codes, or other information derived from a neighboring cell search performed by a mobile terminal.

Another object of the present invention is to provide an apparatus and method for searching a transmission signal from a neighboring base station, by which a signal transmitted from the neighboring base station is searched easily using a simple hardware device without applying an excessive software load to a terminal.

Another object of the present invention is to provide an apparatus and a method for searching neighboring cells rapidly by applying an additional function to an initial cell finder.

Another object of the present invention is to provide an apparatus and a method for searching a transmission signal from a neighboring base station by which neighboring cells can be searched easily, regardless of whether or not information of the neighboring cells is acquired.

To achieve these and other objects and advantages, the present invention provides an apparatus for searching a transmission signal from a neighboring base station according to the present invention which comprises: a matched filter for searching energy of a transmission channel signal transmitted from base stations; an energy storing unit for storing the energy searched by the matched filter by time offsets; an upper processor for controlling a transmission signal acquisition operation from the present base station and a transmission signal acquisition operation from a neighboring base station; a window controller for window masking a location of a base station which is already known according to the control of the high processor; a switching unit for masking the energy outputted from the energy storing unit according to control of the window controller; and a peak detecting unit for detecting a peak of the energy outputted from the switching unit, and acquiring a signal transmitted from the neighboring base station.

To achieve the objects of the present invention, there is provided an apparatus for searching neighboring cell comprising: a matched filter for searching a primary synchronous channel signal; an energy storing unit for storing the energy searched by the matched filter by offsets; a window controller for window masking a location of a cell acquired through an initial cell searching; a switching unit for outputting one of the energy outputted from the energy storing unit and a mask value according to control of the window controller; and a peak detecting unit for detecting a peak of the energy outputted from the switching unit, and acquiring a time information of neighboring cells.

Also, to achieve the objects of the present invention, there is provided a method for searching neighboring cell comprising: a step of performing an initial cell searching; a step of setting a mask window based on a location of the present cell acquired through the initial cell searching; a step of searching an energy of a transmission channel signal transmitted from neighboring cells; a step of storing the searched energy by time offsets; a step of searching a section of the set mask window and remained sections except the mask window selectively according to operation mode; and a step of acquiring location of the neighboring cell using an energy peak searched from the selected sections.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

Figure 1:
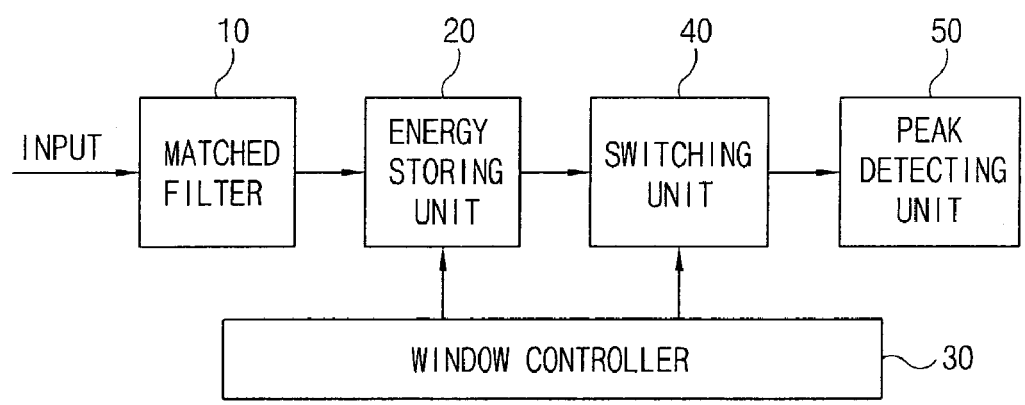
FIG. 1 shows an example of a configuration in an apparatus for searching a transmission signal from a neighboring base station according to an embodiment of the present invention.

FIG. 1 shows an apparatus for searching a transmission signal from a neighboring base station according to an embodiment of the present invention. The apparatus includes a matched filter 10 for searching an energy of a transmission channel signal from a base station, an energy storing unit 20 for storing the energy located by the matched filter 10 by time offsets, a window controller 30 for window masking a location of a cell which is already known, a switching unit 40 for masking the energy output from the energy storing unit 20 according to the control of the window controller 30, and a peak detecting unit 50 for acquiring a signal transmitted from neighboring base station by detecting a peak of the energy outputted from the switching unit 40.

Figure 2:
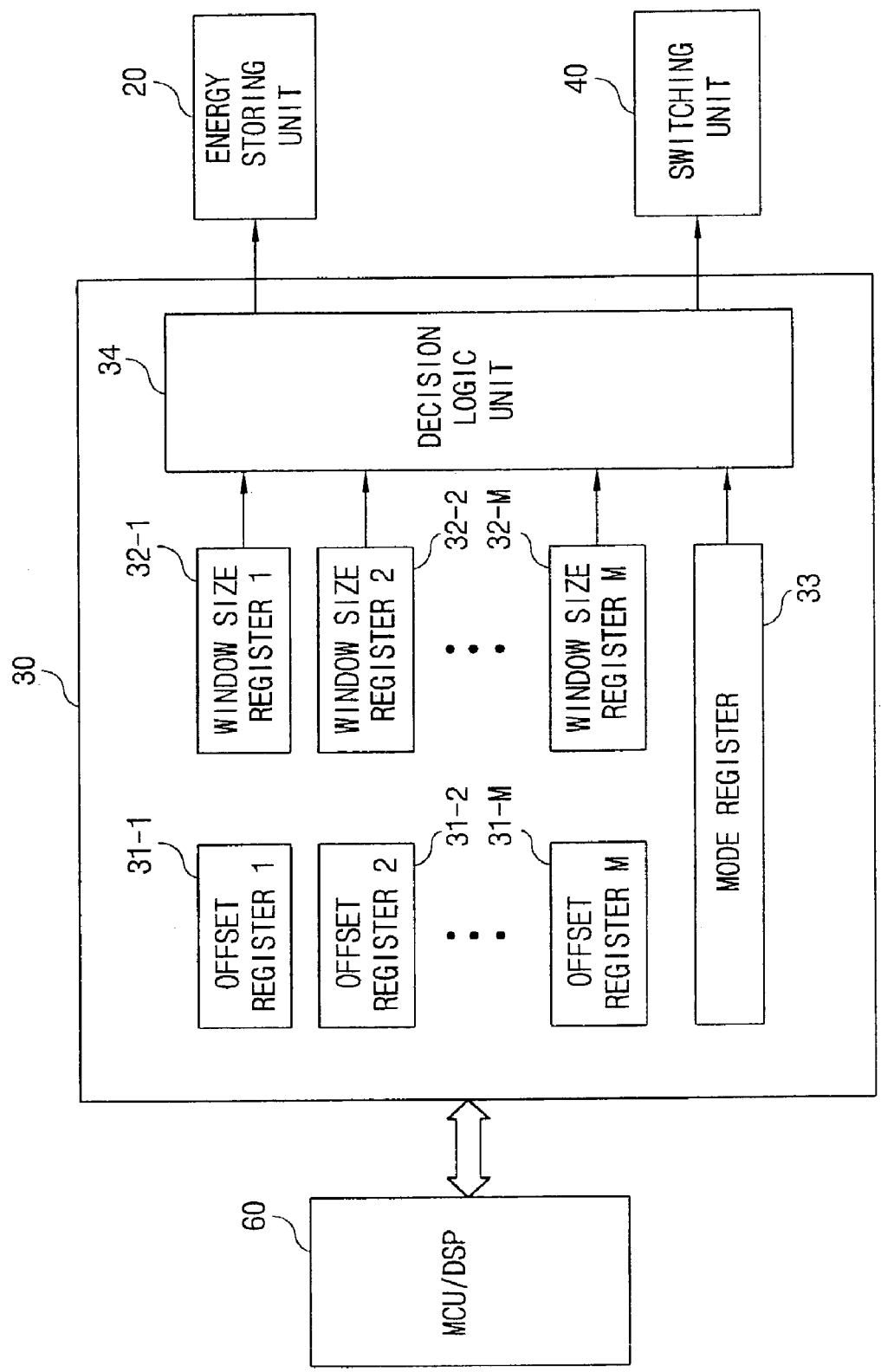
FIG. 2 shows a configuration of a window controller.

FIG. 2 shows one possible configuration of the window controller 30. As shown, this controller includes a plurality of offset registers 31-1-31-M for determining a starting point of a position where the energy by time offsets read from the energy storing unit 20 is masked, a plurality of window size registers 32-1-32-M for determining energies to be masked from the starting point, a mode register 33 for determining an operation mode, and a decision logic unit 34 which outputs a masking control signal based on information of the registers 31-1-31-M, 32-1-32-M and mode register 33 to the switching unit 40.

In the window controller 30, the number of mask windows, offset of the mask windows and size of the mask window are controlled by a microcontroller unit/digital signal processor MCU/DSP 60), which may be an upper processor. The MCU/DSP sets a plurality of mask windows using a plurality of pairs of offset register-window size register pairs included in the window controller 30.

Figure 3:
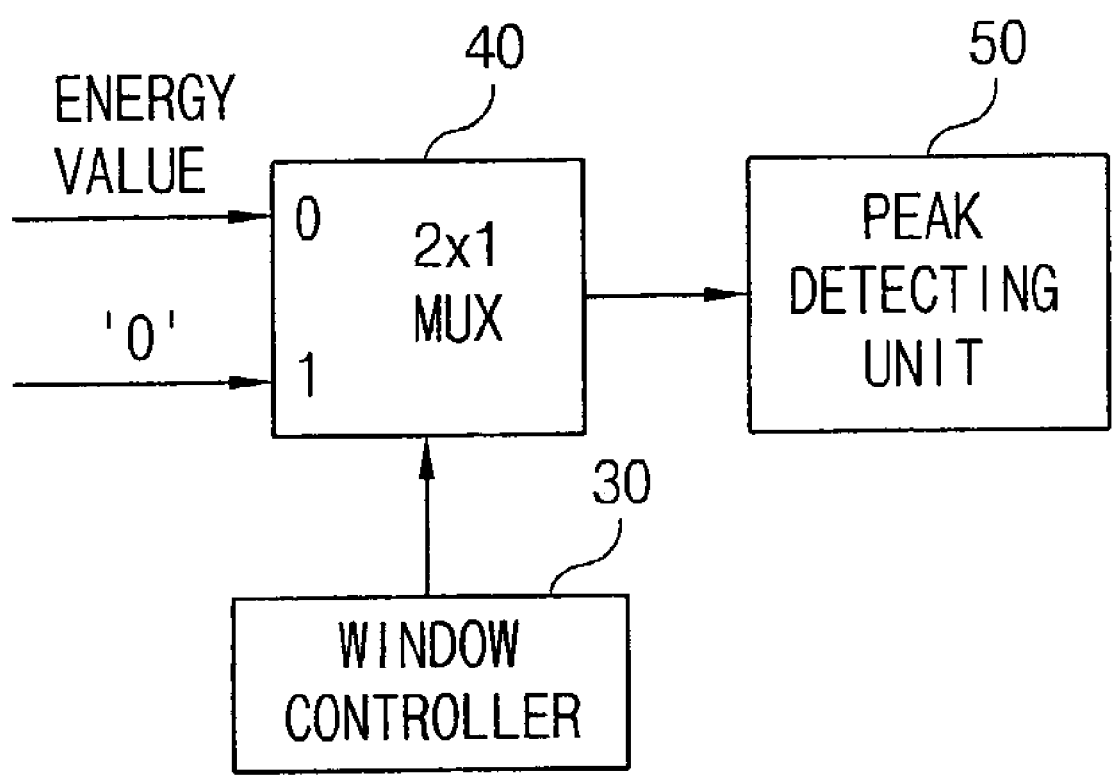
FIG. 3 shows a configuration of a switching unit.

FIG. 3 shows one possible configuration of the switching unit 40. As shown, this unit includes a 2×1 multiplexer which is inputted the energy and mask value output from the energy storing unit 20, for example 0, and selectively outputs one of two inputs to the peak detecting unit 50 based on the masking control signal of the window controller 30.

Operations of the apparatus for searching the transmission signal from the neighboring base station configured as above will now be described. More specifically, as an example, the apparatus for searching a neighboring cell in a terminal which searches the neighboring cells by searching energy of a primary synchronization channel transmitted from the base station will be described.

The apparatus for searching neighboring cells perform the initial cell search according to control of the MCP/DSP 60, that is, the upper processor, and performs a neighboring cell search based on time information of the cell acquired through the initial cell search. It is preferably that the window controller 30 of the apparatus for searching neighboring cells does not perform the window masking when the initial cell search is performed.

The MCU/DSP 60 of the terminal determines whether searching for a certain section is excepted in entire sections, or a certain section out of the entire searching sections is searched on the basis of the acquired time information of the present cell, when the location information of the present cell, that is, the time information is acquired through the initial cell search. Herein, the operation mode of the apparatus for searching neighboring cells can be classified into either a normal mode or an invert mode.

In the normal mode, searching for a certain section is excluded from the entire searching sections. Additionally, in the normal mode, the present cell is searched through the initial cell search and time information for some or all neighboring cells cannot be identified from the present cell, in order to search entire searching sections other than the section of the present cell.

The invert mode is a mode inverted from the normal mode, for searching a certain section in entire searching sections. In the case that rough location information (time information) of the neighboring cells is acquired from the present cell (base station), the invert mode is used for searching a certain section based on the rough time information.

First, a case in which the time information of the present cell is acquired through the initial cell search, and the time information of neighboring cells is not identified will be described.

The MCU/DSP 60 sets the normal mode on the mode register 33 of the window controller 30 in order to search sections other than the present cell which is already known through the initial cell search. Also, the MCU/DSP 60 performs window masking for predetermined sections centering around the time information of the present cell (the window masking for a certain cell can be performed in front and rear 128 chips from the time information of a certain cell). That is, the MCU/DSP 60 inputs a time offset, where the window masking of the present cell is started, into the first offset register 31-1 of the window controller 30, and inputs a size of the mask window for the present cell into the first window size register 32-1. At that time, the number of the mask windows is 1 for the present cell.

When the mask window is set in the window controller 30, the window controller 30 outputs a control signal to the matched filter 10, and the matched filter 10 searches the energy of the primary synchronization channel according to the control signal. The energy storing unit 20 stores the energy identified by the matched filter 10 by time offsets. When the energies for entire search sections are stored, the window controller 30 begins operation.

Figure 4:
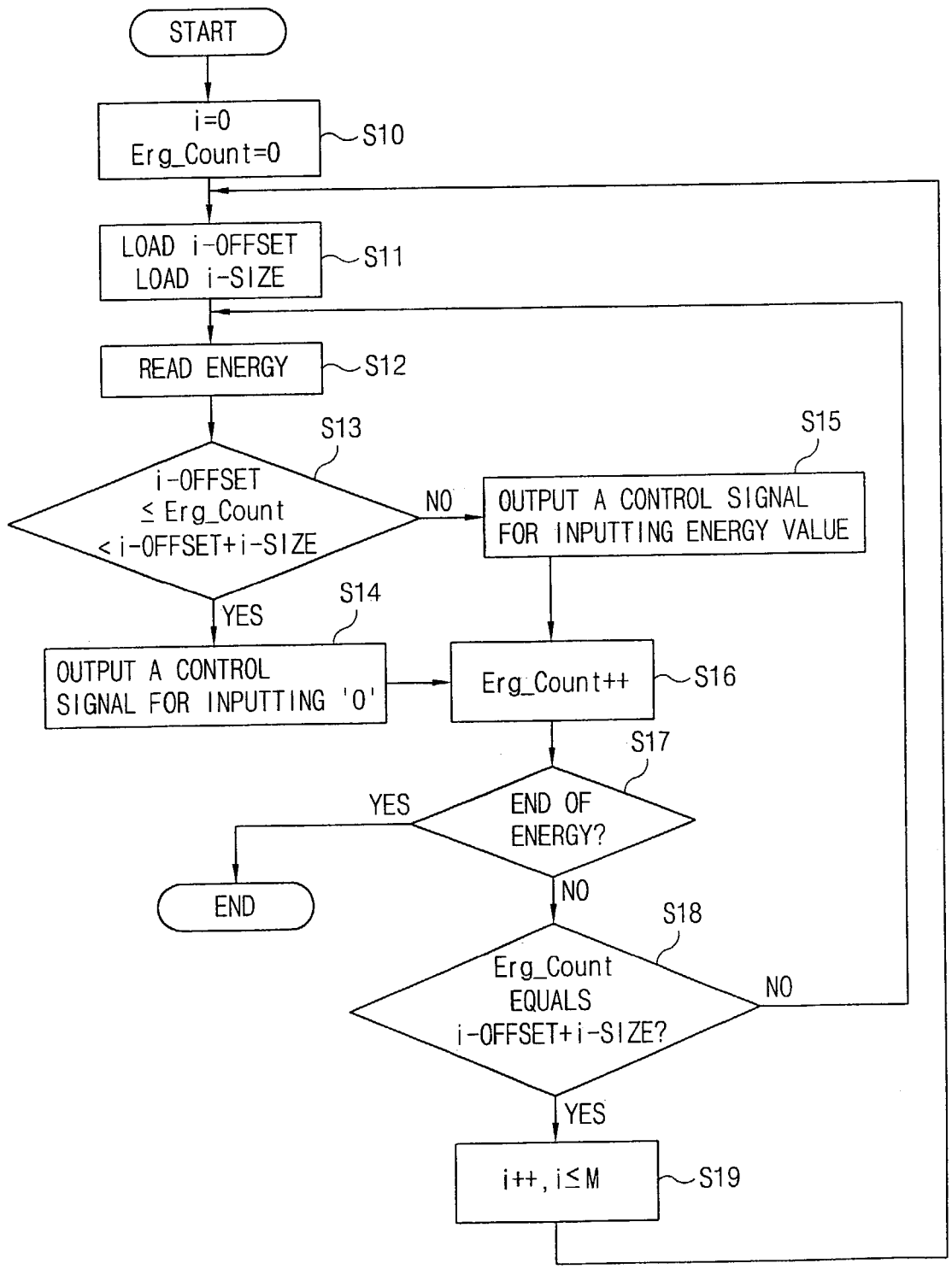
FIG. 4 illustrates a method of window masking by an apparatus for searching neighboring cells in a normal mode.

FIG. 4 is a flow diagram showing steps included in a method for window masking by the window controller 30 when the neighboring cell searching apparatus is operated in the normal mode. In a first step, the decision logic unit 34 of the window controller 30 initializes an index (i) of the presently selected mask window and the number of time offsets (Erg_Count) (S10), and loads the time offset of the presently selected mask window (i-Offset) and the size of the mask window (i-Size) from the corresponding offset register and the window size register, respectively.

For example, in the case that the start time offset and the size of the presently selected mask window are stored in the first offset register 31-1 and in the first window size register 32-1 respectively, the decision logic unit 34 loads the time offset (i-Offset) and the mask window size (i-Size) of the presently selected mask window from the first offset register 31-1 and from the first window size register 32-1 respectively (S11).

The decision logic unit 34 reads the energy values stored in the energy storing unit 20 by time offsets (S12). The decision logic unit 34 also loads the values of the mask windows sequentially.

The decision logic unit 34 identifies whether or not the time offset of the energy value read is included in the presently selected mask window. That is, the decision logic unit 34 identifies whether or not the time offset of the energy value read is greater than or equal to the value of the first offset register 31-1, and smaller than the value of (the first offset register 31-1+the first window size register 32-1) (S13).

When the time offset of the energy value read is not included in the presently selected mask window, the decision logic unit 34 outputs a masking disable signal to the switching unit 40 (S15). The switching unit 40 outputs the energy value into the peak detecting unit 50 according to the masking disable signal.

However, in step S13, if the time offset of the read energy is greater than or equal to the value of the first offset register 31-1, and smaller than (the value of the first offset register 31-1+the value of the first window size register 32-1), that is, the time offset of the read energy is included in the presently selected mask window, the decision logic unit 34 outputs a masking enable signal to the switching unit 40 (S14). The switching unit 40 outputs the mask value (for example, 0) to the peak detecting unit 50 according to the masking enable signal.

The decision logic unit 34 increases the number of the time offset (Erg_Count) of energy which will be read next by as much as 1 (S16), and identifies whether or not the above time offset is the last time offset of the stored energy values (S17).

If the time offset is not the last energy value, the decision logic unit 34 identifies whether or not the time offset is same as the value of the first offset register 31-1+value of the first window size register 32-1. That is, the decision logic unit 34 identifies whether or not the time offset is the last time offset of the presently selected mask window (S18).

If the time offset is not the last time offset of the presently selected mask window, the decision logic unit 34 goes to step S12 in order to read the energy value of the next time offset from the energy storing unit 20.

However, if the time offset is the last time offset of the presently selected mask window, the decision logic unit 34 increases the index (i) of the presently selected mask window by as much as 1. In addition, if the increased i is not larger than the number of mask windows (M) set by the MCU/DSP 60, the decision logic unit 34 goes to S11 in order to load the time offset and size of the next window mask corresponding to the increased i (S19).

In step S17, if the time offset is the last energy value, the decision logic unit 34 ends the window masking operation.

As described above, the window controller 30 reads the energies stored in the energy storing unit 20 in order of time offsets, and inputs 0 into the peak detecting unit 40 if the time offset of the energy is within the mask window range which is pre-set, and inputs the energy into the peak detecting unit 40 directly if the time offset is not included in the mask window range. Therefore, the peak detecting unit 40 is able to identify energy peaks in the areas outside the mask window(s).

Next, the invert mode will be described. In the case that the rough location information (time information) of the neighboring cells is acquired from the present cell, the MCU/DSP 60 sets the mode register 33 to invert mode in order to search a certain section based on the rough time information.

When the neighboring cell searching apparatus is set to invert mode, it performs the same operations as those in the normal mode. However, it performs operations opposite to those performed in the masking operation. That is, the neighboring cell searching apparatus performs the searching operation for the searching section corresponding to the mask window.

The MCU/DSP 60 of the terminal sets the mode register 33 to the invert mode, and sets the mask window based on the rough time information of the neighboring cells to be searched.

Figure 5:
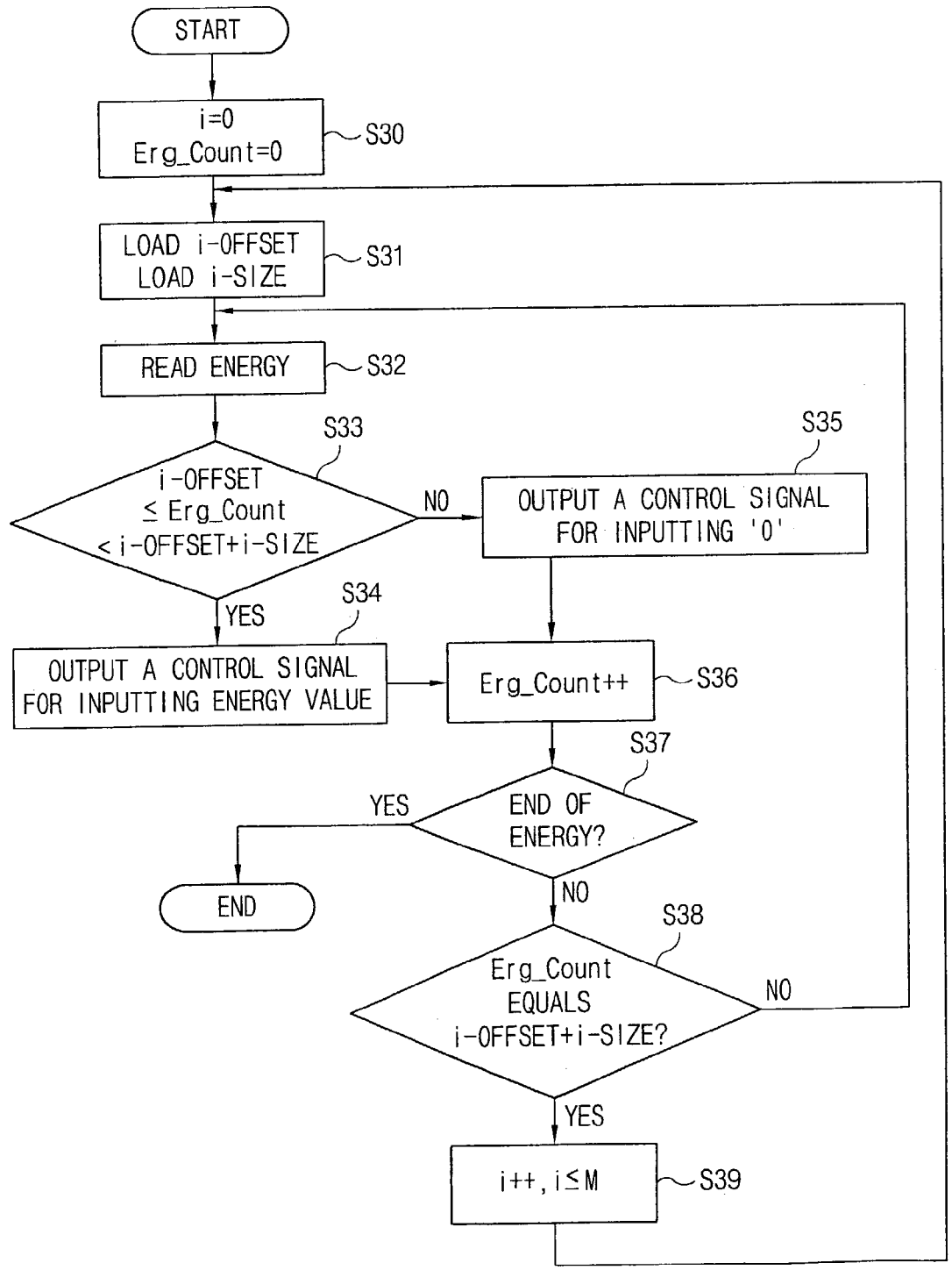
FIG. 5 illustrates a method of window masking by an apparatus for searching neighboring cells in an invert mode.

FIG. 5 shows steps included in a window masking method performed when the neighboring cell searching apparatus is operated in the invert mode. Operations which differ from those of the normal mode will be described as follows.

If the time offset of the energy read from the energy storing unit 20 is included in the mask window set by the window controller 30, the neighboring cell searching apparatus inputs the read energy into the peak detecting unit 40 (S30-S33, S35). If the time offset of the read energy is not included in the mask window, the neighboring cell searching apparatus inputs '0' into the peak detecting unit 40 (S30-S34). Therefore, the neighboring cell searching apparatus performs the search for the sections corresponding to the mask window to acquire precise time information of the neighboring cells.

Figure 6:
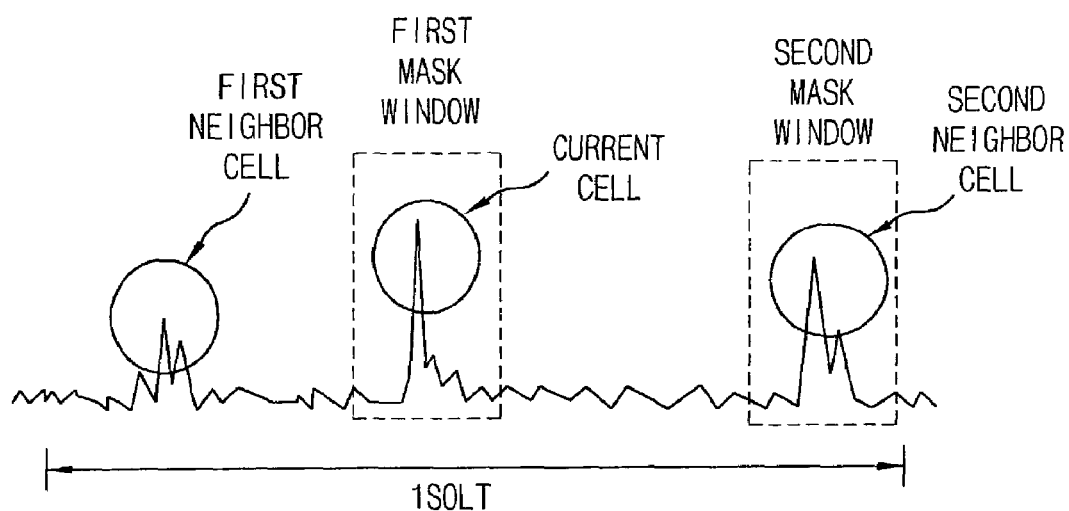
FIG. 6 shows an example of the energy distribution of a signal which is transmitted from a base station.

FIG. 6 shows an example of energy distribution of a signal transmitted from the base station. The present cell represents a cell with which the terminal communicates, and the first neighboring cell and the second neighboring cell are cells around the present cell. A case in which the time information (location information) of the present base station is acquired through the initial cell search, and the time information of the neighboring cells is not provided from the present cell (base station) will now be described.

The neighboring cell searching apparatus of the terminal sets the first mask window based on the time information of the present cell and sets the operation mode as the normal mode in order to search the neighboring cells.

The neighboring cell searching apparatus of the terminal inputs the energies of sections other than the first mask window area into the peak detecting unit 40. It inputs the area of the first mask window as '0'.

Then, the peak detecting unit 40 detects one or more peaks among the inputted energies to acquire the time information of the neighboring cells, and the neighboring cell searching apparatus acquires the time information of the second neighboring cell as shown in FIG. 6.

After that, the neighboring cell searching apparatus of the terminal performs window masking for the location of the present cell and the location of the second neighboring cell which is found while searching for the first neighboring cell.

The neighboring cell searching apparatus operated in the normal mode inputs the energy values corresponding to the mask windows of the present cell and of the second neighboring cell into the peak detecting unit 40 as '0', and inputs the energies of remaining sections (other than the mask windows) into the peak detecting unit 40 to detect peak energy levels and acquire the time information of the first neighboring cell.

The peak detecting unit 40 includes a storage unit in which the energies selected by the window controller 30 are stored, in order to detect peak energy levels and acquire the time information of the neighboring cell.

If too many energies are stored in the storage unit, noise can be mistaken for the neighboring cell if the peak of the noise is larger than the energy of the cell. Therefore, operations for identifying may need to be repeated, so the storage is set in advance to an appropriate size to allow the function of the system to be optimized.

In the above case, the second neighboring cell is found by window masking the present cell, and the first neighboring cell is found by window masking the present cell and the second neighboring cell.

However, if the size of the storage unit for the selected energy included in the peak detecting unit 40 is large enough to store the energies of remaining sections (other than the mask window) for the present cell, and if the neighboring cell exists on the position of energy peak, the first and the second neighboring cells can be found at one time without changing the mask window setting.

As described above, according to the apparatus and the method for searching transmission signal from the neighboring base station of the present invention, the signal transmitted from the base station can be searched easily by applying a window masking function to the initial cell searching apparatus without applying an excessive software load to the terminal.

According to the present invention, the neighboring cells can be searched with high speed by applying the window masking function to the initial cell searching apparatus, even when information about the neighboring cell is not obtained.

Also, according to the present invention, the cell search is performed except for a cell which is already known and the multi-paths of the cell by window masking predetermined sections centering around the position of the cell which is already known, and therefore all neighboring cells can be searched.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for searching a transmission signal from a neighboring base station, comprising:
    a matched filter for searching energy of a transmission channel signal;
    an energy storing unit for storing the energy searched by the matched filter by time offsets;
    a processor for controlling transmission signal acquisition of a present base station and a transmission signal acquisition of a neighboring base station;
    a window controller for window masking a location of a base station that is known based on controls of the processor;
    a switching unit for masking the energy outputted from the energy storing unit based on controls of the window controller; and
    a peak detecting unit for detecting a peak of the energy output from the switching unit and acquiring a signal transmitted from the neighboring base station.

2. The apparatus of claim 1, wherein the transmission channel signal comprises a primary synchronization channel signal.

3. The apparatus of claim 1, wherein the window controller comprises:
    a plurality of offset registers for deciding starting points of masking the energies by time offsets read from the energy storing unit according to control of the processor;
    a plurality of window size registers for deciding a number of energies to be masked from a starting point according to the control of the processor;
    a mode register for deciding an operation mode based on control of the processor; and
    a decision logic unit for controlling switching of the switching unit based on information provided by the registers.

4. The apparatus of claim 3, wherein the offset registers and the window size registers form pairs, and wherein a number of pairs formed are the same as a number of mask windows.

5. The apparatus of claim 4, wherein the number of mask windows is set by the processor.

6. The apparatus of claim 1, wherein the window controller outputs a first control signal for searching sections other than sections corresponding to the mask window when an operation mode is normal mode, and outputs a second control signal for searching the sections corresponding to the mask window when the operation mode is invert mode.

7. The apparatus of claim 6, wherein the switching unit inputs a mask value during a section corresponding to the mask window and the energies outputted from the energy storing unit during the sections other than the mask window into the peak detecting unit, according to the first control signal, and inputs the energies outputted from the energy storing unit during the section corresponding to the mask window and the mask value during the sections other than the mask window into the peak detecting unit, according to the second control signal.

8. The apparatus of claim 1, wherein the processor controls the window controller based on the transmission signal of a present base station in order to search the transmission signal of the neighboring base station, when the transmission signal of the present base station is acquired by the peak detecting unit.

9. An apparatus for searching neighboring cells, comprising:
    a matched filter for searching a primary synchronous channel signal;
    an energy storing unit for storing energy searched by the matched filter by offsets;
    a window controller for window masking a location of a cell acquired through an initial cell searching;
    a switching unit for outputting one of the energies outputted from the energy storing unit and a cask value according to control of the window controller; and
    a peak detecting unit for detecting a peak of the energy outputted from the switching unit and acquiring time information of neighboring cells.

10. The apparatus of claim 9, further comprising:
    an upper processor that sets an operation mode of the window controller and the mask window based on the information of the cell acquired through the initial cell searching.

11. The apparatus of claim 9, wherein the window controller performs window masking using the time information of a present cell, when the time information of the present cell is acquired through the initial cell searching by the peak detecting unit.

12. The apparatus of claim 9, wherein the window controller comprises:
    a plurality of offset registers for determining starting points for masking the energies by time offsets read from the energy storing unit;
    a plurality of window size registers for determining the number of energies to be masked from a starting point;

a mode register for deciding an operation mode; and a decision logic unit for outputting first and second control signals into the switching unit based on information provided by the registers.

13. The apparatus of claim 12, wherein the switching unit outputs '0' on a mask window section and outputs read energy on sections other than a mask window according to the first control signal, and outputs the read energy on the mask window section and outputs '0' on the sections other than the mask window according to the second control signal.

14. A method for searching neighboring cells comprising:
performing an initial cell search;
setting a mask window based on a location of a present cell that is acquired through the initial cell search;
searching energies of a transmission channel signal transmitted from neighboring cells;
storing the energies by time offsets;
searching the section of a set mask window and any remaining sections other than a section of the mask window selected according to an operation mode; and
acquiring locations of neighboring cells using energy peaks identified in the selected sections.

15. The method of claim 14, wherein the operation mode is determined according to whether or not information of approximate location of neighboring cells is acquired from that of the present cell.

16. The method of claim 14, wherein '0' in the section of the mask window and the stored energies in the sections other than the mask window are switched to a peak detecting unit when the operation mode is a normal mode, and the stored energies in the section of the mask window and '0' in the sections other than the mask window are switched to the peak detecting unit when the operation mode is an invert mode.

17. A method for locating cells in a communications service area, comprising:
masking a signal from a first cell transmitted in a transmission channel;
detecting a peak energy signal within the transmission channel;
identifying a second cell based on the peak energy signal;
masking a signal from the second cell transmitted in the transmission channel;
detecting a peak energy signal within the transmission channel at a time when the signal from the first cell and the signal from the second cell are masked; and
identifying a third cell based on the peak energy signal detected in the transmission channel at a time when the signal from the first cell and the signal from the second cell are masked.

18. The method of claim 17, wherein the first cell and the second cell are neighboring cells.

19. The method of claim 17, wherein said masking includes:
identifying time information corresponding to the first cell; and
generating a first mask for masking the signal from the first cell based on the time information corresponding to the first cell.

20. The method of claim 17, further comprising:
determining time information of the second cell based on the peak energy signal.

21. The method of claim 20, further comprising:
determining a location of the second cell relative to a location of the first cell based on the time information of the second cell.

22. The method of claim 17, wherein said masking the signal from the second cell includes:
identifying time information corresponding to the second cell; and
generating a second mask for masking the signal from the second cell based on the time information corresponding to the second cell.

23. The method of claim 17, further comprising:
determining time information of the third cell based on the peak energy signal corresponding to the third cell.

24. The method of claim 23, further comprising:
determining a location of the third cell based on the time information of the third cell.

25. The method of claim 17, further comprising:
determining time information of the second cell based on the peak energy signal corresponding to the second cell;
determining a location of the second cell relative to the first cell based on the time information of the second cell;
determining time information of the third cell based on the peak energy signal corresponding to the third cell; and
determining a location of the third cell relative to at least the first cell based on time information of the second cell.

26. The method of claim 25, further comprising:
determining which one of the second cell and the third cell is closer to the first cell.

27. The method of claim 26, further comprising:
performing a hand-off operation from the first cell to the one of the second cell and the third cell that is determined to be closer to the first cell.

* * * * *